United States Patent
Kuiper et al.

(10) Patent No.: US 7,069,692 B2
(45) Date of Patent: Jul. 4, 2006

(54) METHOD AND SYSTEM FOR GROWING PLANTS

(75) Inventors: Daan Kuiper, St Ell (NL); Anton Blaakmeer, Le Venray (NL)

(73) Assignee: Rockwool International A/S, Hedehusene (DK)

( * ) Notice: Subject to any disclaimer, the term of this patent is extended or adjusted under 35 U.S.C. 154(b) by 51 days.

(21) Appl. No.: 10/482,915

(22) PCT Filed: Jul. 11, 2002

(86) PCT No.: PCT/EP02/07881

§ 371 (c)(1),
(2), (4) Date: Jun. 28, 2004

(87) PCT Pub. No.: WO03/005807

PCT Pub. Date: Jan. 23, 2003

(65) Prior Publication Data

US 2004/0231240 A1 Nov. 25, 2004

(30) Foreign Application Priority Data

Jul. 13, 2001 (GB) .................................. 0117182

(51) Int. Cl.
*A01G 31/00* (2006.01)

(52) U.S. Cl. ..................................... 47/62 A
(58) Field of Classification Search ............... 47/59 R, 47/62 R, 62 A, 17, 58.1 R, DIG. 9
See application file for complete search history.

(56) References Cited

U.S. PATENT DOCUMENTS

| 4,203,389 A | 5/1980 | Gasper, Jr. et al. |
| 5,590,490 A | 1/1997 | Kikuchi |

FOREIGN PATENT DOCUMENTS

| DE | 33 31 818 | 3/1985 |
| EP | 0 300 536 | 1/1989 |
| EP | 0 409 348 | 1/1991 |

*Primary Examiner*—T. Nguyen
(74) *Attorney, Agent, or Firm*—Dickstein, Shapiro, Morin & Oshinsky, LLP.

(57) ABSTRACT

A method of monitoring one or more growing plants comprising: (i) providing at least one plant in a growth substrate which contains water, (ii) providing a monitoring system comprising (a) a first data storage means containing stored data on the optimum water oxygen levels for at least one, preferably at least two, sets of growth conditions and (b) a first calculating means for comparing input actual growth conditions and actual water oxygen levels with the stored data and producing a first output result and (c) input means for supplying to the monitoring system actual growth conditions and actual water oxygen levels, the process comprising: (iii) measuring the actual water oxygen level in the region around the roots of the at least one plant, (iv) providing the actual water oxygen level to the first calculating means, (v) determining at least one growth condition and supplying the growth condition to the first calculating means, whereby (vi) the first calculating means compares the actual water oxygen level and the at least one growth condition with the stored data and provides the first output result. The invention also provides a monitoring system, which is preferably an oxygen sensor system, for use in this method, and methods of growing plants using this monitoring method.

16 Claims, 1 Drawing Sheet

METHOD AND SYSTEM FOR GROWING PLANTS

The invention relates to methods for cultivating plants in a growth substrate, especially a mineral wool growth substrate, and in particular relates to methods in which the conditions of growth are monitored and controlled. The invention also relates to systems for use in the method.

BACKGROUND OF THE INVENTION

It is well known to cultivate plants in a natural or artificial growth substrate., in particular a mineral wool growth substrate, such as rock wool or glass wool. Water and, if necessary, fertiliser are supplied to the mineral wool substrate, generally by causing water, optionally containing fertiliser, to flow through the substrate.

In systems of this type it is important that the roots of the plants receive an appropriate supply of oxygen. The level of dissolved oxygen in the water around the roots of the plant (water oxygen level) is important because this determines the oxygen available to the plant.

An oxygen sensing device is known in the food industry. Such a device has been described in "A Novel optical Method to Determine Oxygen in Beer Bottles", Draaijer et al, European Brewery Convention 27th Congress 1999, for determination of oxygen in food containers such as beer bottles. This method is also discussed in "An optical oxygen sensor", Draaijer et al, $2^{nd}$ Inter-Regional Conference on Environment-Water, 1 to 3 Sep. 1999. In this latter paper use for monitoring oxygen levels in groundwater and mineral wool growth substrates is suggested. For the latter use a fibre optic version is recommended. WO 01/63264, published 30 Aug. 2001, discloses an optical sensor for measuring oxygen levels, primarily for measurement of such levels in consumable products stored in glass.

However, the requirements for water oxygen levels are complex and simply determining water oxygen level is not generally sufficient to tell the grower whether or not conditions are optimum. For instance, a given oxygen content might be acceptable for one type of plant but not another, or might be acceptable for a plant at one stage of its growth and not another, or low water oxygen level (ie. low water oxygen content) in a system having a high water replacement rate may not be problematic whereas water oxygen level would be problematic in a system having lower water replacement rate. Thus there is a complex interaction between the various growth conditions which determines whether or not a given water oxygen level is acceptable.

In the past, growers have not monitored plant growth conditions in a truly systematic manner. In general, a visual observation of plant conditions and, in some cases; measurement of water content of the substrates in which the plants are grown is used to assess whether conditions require modification. If this rather imprecise observation method suggests that conditions are not optimal, changes can be made for instance in the content of water in the substrate or the rate of water supply. In the past, although growers have been generally aware that water oxygen level is a potential factor in the suitability of growth conditions, they have not focussed specifically on water oxygen level and its measurement as a means of assessing whether growth conditions are optimal.

SUMMARY OF THE INVENTION

The invention is based at least partly on the realisation that water oxygen levels (ie water oxygen contents) are a valuable tool for determining whether conditions are optimal. Thus it would be desirable for growers to be able to know rapidly and accurately whether water oxygen levels are sub-optimal so that they can modify conditions if necessary to ensure the system tends towards optimum water oxygen levels.

According to the invention we provide a method of monitoring one or more growing plants comprising (i) providing at least one plant in a growth substrate which contains water, (ii) providing a monitoring system comprising (a) a first data storage means containing stored data on the optimum water oxygen levels for at least one, preferably at least two, sets of growth conditions and (b) a first calculating means for comparing input actual growth conditions and input actual water oxygen levels with the stored data and producing a first output result and (c) input means for supplying to the monitoring system actual growth conditions and actual water oxygen levels, the method comprising (iii) measuring the actual water oxygen level in the region around the roots of the at least one plant, (iv) providing the actual water oxygen level to the first calculating means, (v) determining at least one actual growth condition and providing the at least one growth condition to the first calculating means, whereby (vi) the first calculating means compares the actual water oxygen level and the at least one actual growth condition with the stored data and provides the first output result.

Thus in the invention we use stored data, usually held on a computer database, which-can be interrogated by the first calculating means, usually a computer program, and compared with the actual growth conditions and actual water oxygen level. The use of this system allows the grower to assess quickly and easily whether the water oxygen levels in the system are appropriate for that particular system. In preferred embodiment, the results are displayed in such a way that the grower is informed what changes should be made to the system in order to achieve an optimum water oxygen level.

We also provide a system for use in the method comprising (a) a first data storage means containing stored data on the optimum water oxygen levels for at least one, preferably at least two, sets of growth conditions and (b) a first calculating means for comparing actual growth conditions and actual water oxygen level with the stored data and (c) input means for providing to the monitoring system actual growth conditions and actual water oxygen levels, optionally (d) a second data storage means containing stored modification data on methods for increasing and decreasing water oxygen level and (e); a second calculating means for comparing the first output result with the stored modification data to give a second output result which specifies what modifications must be made to the growth conditions to achieve an optimum water oxygen level, and (f) a display means for receiving the first output result and/or the second output result and displaying these.

The invention also provides an oxygen sensor system comprising-a sensor for measuring water oxygen level in the region around the roots of a plant growing in a growth substrate and a monitoring system as discussed above.

DESCRIPTION OF THE INVENTION

Figure 1:
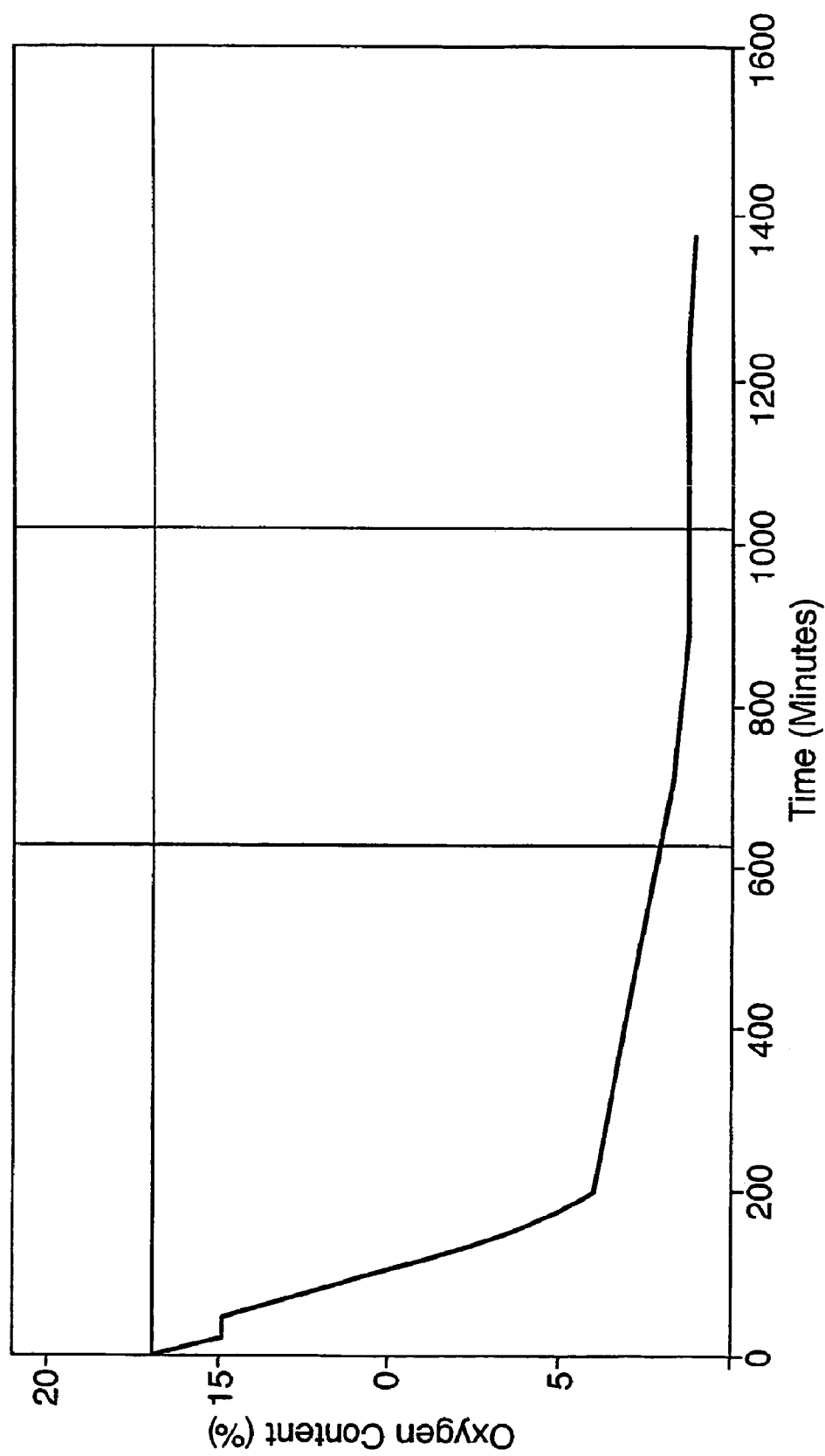
FIG. 1 is a plot of the change in oxygen content values over time

The plants are generally commercial crops of the type grown in greenhouses. They can be in the form of seedlings but are often larger. The crop may for instance be a commercial crop, eg lettuce, tomato, cucumber or sweet pepper.

Any natural or artificial growth substrate can be used, for instance soil, peat, perlite or man made vitreous fibres (MMVF). Preferably the growth substrate is formed from mineral wool such as glass wool or, preferably, rock wool.

The mineral wool growth substrate may be made in conventional manner by providing a mineral melt and forming fibres from the melt. During production of the fibres or, less preferably, after production of the fibres, binder may be applied to the fibres. The binder is generally subsequently cured in a curing oven.

The growth substrate preferably contains a wetting agent. This may be used in addition to the binder. Alternatively, a single material may be used which acts as binder and wetting agent.

The growth substrate may contain other additives known in the art for modifying and improving properties, such as clay or lignite.

The monitoring system comprises data storage means, usually a computer database, which holds information on the relationship between optimum water oxygen level and various growth conditions. Thus for instance it can hold information about the optimum water oxygen level for different species of plant, and/or information about the effect on optimum water oxygen level of different growth substrate water contents. Further-information on growth conditions is given below.

The data storage means can be situated on site, ie close to the growing system, for instance in a computer owned by the grower or on a server at the grower's premises. In one embodiment, the input means is an oxygen sensor apparatus which also contains the first data storage means and the first calculating means. If such an embodiment is used the oxygen sensor can also comprise the second storage means and second calculating means, if used (see below). Alternatively, the database may be remote from the growing site and can be connected to the remainder of the system for instance by an internet connection.

In one embodiment the monitoring system also comprises a second storage means which stores data on methods for modification of the water oxygen level, dependent upon the relationship of this level with the optimum and the factors which cause the water oxygen level to be sub-optimal. For instance, the data may relate to methods for increasing the rate of flow of water through the growth substrate when the water oxygen level is too low for the actual rate of flow of water, eg it may include information on optimum combinations of water flow rates and water oxygen levels.

The monitoring system comprises a first calculating means. Generally this is in the form of a computer provided with a program code. This takes the input actual growth conditions and the input actual water oxygen level and interrogates the stored data so as to assess whether the actual water oxygen level is optimum for the actual growth conditions. The computer program will include algorithms which relate the input data and the stored data and the output data.

Preferably the first calculating means uses the stored data to assess what would be optimum water oxygen levels in view of the input actual growth conditions and compares these with the measured actual water oxygen levels.

Depending upon the sophistication of the computer program, the first output result may be a simple indication of whether or not water oxygen levels are optimum. It may additionally indicate whether the water oxygen level is higher or lower than optimal. It may indicate comparisons between the water oxygen level and the water oxygen level which would be optimal.

In a preferred embodiment the monitoring system also comprises a second calculating means. This takes as input the first output result from the first calculating means. The first and second calculating means may be provided by a single computer program.

The second calculating means assesses, given the actual growth conditions, the actual water oxygen level and the calculated optimum water oxygen level, what changes can be made to the growth conditions so as to bring the water oxygen level closer to optimum, and preferably within the optimum range.

In doing this the second calculating means interrogates a second data storage means, discussed above, having thereon data concerning growth conditions which are most easily modified and the effects of modifications on water oxygen level.

Preferably the monitoring system also comprises a display means. This can display the first output result and, if there is one, the second output result. Thus for instance in the simplest case the display means may display a signal, such as a light, or a light of specified different colours, according to whether the actual-water oxygen level is acceptable. It may be a display screen which gives information on whether the actual water oxygen level is too high or too low. It may also display, for the convenience of the grower, the actual oxygen level and the actual growth conditions which have been input into the system.

The stored data relating to optimum water oxygen levels may relate to various different growth conditions.

For instance, information may be stored about how optimum oxygen level varies with plant type, plant age, plant phase (eg generative, vegetative).

It may indicate how optimum water oxygen level varies according to the presence and types of microorganisms in the growth substrate.

It may indicate how optimum water oxygen level various according to substrate type, in particular dimensions, binder type, binder content, fibre diameter and wetting agent type in the case of mineral wool growth substrate. It may contain information about the influence of additives on optimum water oxygen level.

Information may relate to time of day, time of year or ambient conditions such as temperature, humidity and light level.

The data may also relate to the effect of water content in the substrate, the irrigation method used and rates of water flow through the substrate on the optimum oxygen water level. In this particular case, the water content of the substrate is itself often affected by the irrigation method and therefore it is often necessary only to input one of these growth conditions.

The system also comprises means for inputting details of the actual growth conditions, which may be any of the conditions discussed above. Such means may for instance be a mouse or keyboard.

Preferably the stored data relates to at least two, preferably at least three, more preferably at least four different growth conditions. Preferably at least two, more preferably at least three and in particular at least four growth conditions are determined and input into the monitoring system.

Growth conditions may be determined by observation (eg in the case of plant type) or by measurement (eg in the case of water content in the substrate or ambient temperature).

As an example of the relationship between water oxygen level and certain growth conditions, the database may contain information on the critical oxygen pressure, for particular types of plant at a specified age and/or at differing times of day. Critical oxygen pressure (COP) is a way of defining the minimum water oxygen level required under a particular set of conditions, ie optimum water oxygen level. Critical oxygen pressure is defined by Berry L. J. and Norris W. E. in Biochem. Biophys. Acta. 3:593–606 (1949). The critical oxygen pressure can be expressed as a percentage, in which case it is the percentage of oxygen in the water based on the maximum possible (21%). Preferably, however, it is expressed as oxygen in water concentration $mgO_2$/litre water (mg/l), apd in the specification we give values in mg/l.

In particular, we find that for tomato and cucumber plants at various ages have COP values in a substrate having zero water flow rate and 100 percent water content, as follows:

Tomato, age 150 to 200 days, preferably 175 to 190 days (all times of day and night): 3 to 6 mg/l preferably 4 to 5 mg/l Cucumber, age 50 to 100 days, preferably 60 to 80 days, morning: 5 to 7 mg/l preferably about 6 mg/l.

Cucumber, age 50 to 100 days, preferably 60 to 80 days, middle of day: 4 to 6 mg/l preferably about 5 mg/l.

Cucumber, age 50 to 100 days, preferably 60 to 80 days, night: 2 to 5 mg/l preferably 3 to 4 mg/l.

Cucumber, age 140 to 90 days, preferably 150 to 170 days, morning: 3 to 5 mg/l, preferably about 4 mg/l.

Cucumber, age 140 to 180 days, preferably 160 to 170 days, middle of day: 1 to 3 mg/l, preferably about 2 mg/l.

Cucumber, age 140 to 180 days, preferably 150 to 170 days, night: 1 to 3 mg/l, preferably-about 2 mg/l.

The invention is thus particularly valuable when the stored data includes optimum water oxygen levels for growth conditions selected from the group plant type, plant age, time of day and water flow rate. Particularly preferably the growth conditions include at least one of plant type, plant age and time of day, more preferably all three.

One way of determining COP values is as follows. A block of mineral wool growth substrate containing the plant is flushed several times with oxygen rich water. After flushing, the block is placed in an open box of volume 650 ml. A two-part lid is placed on the box and all of the seams are sealed with clay. An oxygen sensor, for instance as described in WO 01/63264, is placed in the box, embedded in the growth substrate, and the oxygen content is measured for a predetermined period. This method is particularly suitable for small plants.

For larger plants a different system is used which does not involve sealing the plant in the box. Instead, the flushing of the block of mineral wool growth substrate is assumed to produce 100% water content in the substrate and thus diffusion rate of oxygen into the growth substrate of substantially zero. In this method the flushed block is placed in an open box which is not sealed. The oxygen sensor is embedded in the growth substrate and oxygen content measured for a predetermined period.

From the change in oxygen content values over time, oxygen consumption rate can be plotted. At oxygen concentrations above the COP the oxygen consumption is constant. At oxygen concentrations below the COP the oxygen consumption decreases rapidly over time. Thus a plot can be made of oxygen content over time which includes a first section, usually of high gradient, which is essentially linear and a further section of low, close to zero, gradient. The oxygen concentration at which the plot first deviates from the linear is the COP. An example of such a plot is shown in FIG. 1, in which the COP is about 4%.

We have found that the rate of flow of water through the growth substrate can-have a significant effect on the water oxygen levels which are required. In particular, optimum water oxygen level may be lower when the flow rate of water is higher because this inevitably brings with it a high replenishment rate. Further, high water flow rates can lead to turbulence and increase transfer of oxygen into the roots from the water surrounding the roots. Consequently, optimum water oxygen level does-not need to be so high. A preferred-means of modifying the water flow-rate is by applying air suction or air pressure to the substrate. In a preferred system air suction is applied. Suitable systems are described in our earlier patent publications EP-A-300,536 and EP-A-409,348. A further suitable system is described in our co-pending International Patent Application No. . . . , filed today, having reference LAS01300WO and claiming priority from British Patent Application number 0117183.4

We also find that the optimum water-oxygen level can vary according to the water content in the growth substrate. This is because the diffusion rate of oxygen in water is significantly (10,000 times) lower than the diffusion rate of oxygen in air. Substrates having lower water content, and hence greater air content, will exhibit a greater degree of oxygen diffusion into and through the substrate and thus at any one time the optimum water oxygen level need not be so high as in cases where the diffusion rate is lower. The oxygen diffusion model discussed below is one way of determining the diffusion coefficient for any given system.

The diffusion coefficient D for any particular system can be determined using the following relationship:

$$\partial c/\partial t = \partial(D_{xx}\Phi \partial c/\partial x)/\partial x + \partial(D_{yy}\Phi \partial c/\partial y)/\partial y + \partial(D_{zz}\Phi \partial c/\partial z)/\partial z$$

In which c is concentration, t is time and x, y and z are the distances within the block in each of the x, y and z directions from the sensor. $D_{xx}$, $D_{yy}$ and $D_{zz}$ are the diffusion coefficients in the x, y and z directions, respectively. It is generally assumed that these are the same. $\Phi$ is the porosity of the substrate (measured in standard manner by determining the time required to flush a certain amount of liquid through the substrate).

Thus it is possible for the stored data to include details of diffusion coefficients for particular sets of circumstances, in particular water content of a substrate. For instance, a rock wool growth substrate having water content about 31% can have diffusion coefficient from $1 \times 10^{-8}$ to $1 \times 10^{-6}$, preferably from $1.5 \times 10^{-8}$ to $9 \times 10^{-2}$ m$^2$/s. Systems having water content about 52% can have diffusion coefficient of from about $5 \times 10^{-9}$ to about $3 \times 10^{-7}$ m$^2$/s. Growth substrate having water content about 93% can exhibit diffusion coefficient in the range of about $4 \times 10^{-10}$ to $7 \times 10^{-9}$ m$^2$/s.

It will be seen that the invention provides a system in which potentially all of these factors can be taken into account. Thus for instance one embodiment includes growth of plants such as tomatoes and cucumbers wherein the stored data includes information on the COP of these plants at various stages of growth and various times of day, together with data on the influence of water content and water flow rate on the optimum water oxygen level (or COP).

Inputting the actual water oxygen level and details of plant type, age, time of day, water flow rate if relevant and water content allows an accurate determination of the optimum water oxygen level for the relevant set of circumstances.

In the method an oxygen sensor is used to measure the actual water oxygen level. Preferably this sensor is one of those described by Draaijer et al in "A novel optical method to determine oxygen in beer bottles", EBC 27th Congress 1999, and "An Optical Oxygen Sensor" 1999 (both discussed above) or WO 01/63264.

Alternative systems are disclosed by, Bambot S. B. et al, "Phase fluorimetric sterilisable optical oxygen sensor", Biotechnology and Bioengineering, vol. 43., pp 1139–1145, 1994; Cox, M. E. et al, "Detection of oxygen by fluorescence quenching", Applied Optics, vol.; 24, number 14, pp2114–2120, 1985; Meier, B. et al, "Novel oxygen sensor material based on a ruthenium bipyridyl complex encapsulated in zeolite Y", Sensor and Actuators B29 (1995) 240–245.

Thus preferably the oxygen sensor is based on fluorescence quenching by oxygen. Electrochemical Clark-type oxygen sensors may also be used but are less preferred.

The actual water oxygen content may be supplied to the monitoring system automatically directly from the oxygen sensor or it may be measured and then input manually.

The sensor apparatus may, as well as measuring water oxygen level, may also be configured as a single apparatus which measures other parameters of the growth environment. For instance as well as measuring water oxygen level a sensor may measure other parameters such as substrate water-content and temperatures, preferably both.

In the method the sensor may be positioned in any manner which allows determination of actual water oxygen level. However, we find that in some embodiments a sensor inserted into a growth substrate gives most consistent measurements when positioned from 0.5 to 4 cm, preferably 0.5 to 2 cm from the base of the substrate.

In the method the growth substrate is irrigated. This may be periodic but is generally continuous. It may be by any conventional method, eg drip feeding. The growth substrate is supplied with water and optionally fertilisers and excess water are discharged from the system.

Other gases and additives or nutrients can affect the growth of plants when dissolved in the water in the region of the roots. These include carbon dioxide, ethylene and methanol, in particular ethylene. It will be seen that the invention may be applied to such gases also, instead using data relating to optimum levels of these gases in the water and measuring levels of these gases.

Other constituents of the water in the region of the plant roots can in some circumstances have a level which is dependent upon the oxygen level. Thus in the invention it is possible that the measurement of the actual water oxygen level is done by sensing the level of another constituent and using a known relationship between this constituent and water oxygen level to determine the actual water oxygen level. For instance, the water carbon dioxide level is dependent upon the water oxygen level and it is therefore possible to provide a carbon dioxide sensor which senses actual water carbon dioxide level and to use the known relationship between carbon dioxide content and oxygen content to establish the actual water oxygen level.

The invention claimed is:

1. A method of monitoring one or more growing plants comprising
    (i) providing at least one plant in a growth substrate which contains water,
    (ii) providing a monitoring system comprising (a) a first data storage means containing stored data on the optimum water oxygen levels for at least one, of growth conditions and (b) a first calculating means for comparing input actual growth conditions and actual water oxygen levels with the stored data and producing a first output result and (c) input means for supplying to the monitoring system actual growth conditions and actual water oxygen levels, the process comprising
    (iii) measuring the actual water oxygen level in the region around the roots of the at least one plant,
    (iv) providing the actual water oxygen level to the first calculating means,
    (v) determining at least one growth condition and supplying the growth condition to the first calculating means, whereby
    (vi) the first calculating means compares the actual water oxygen level and the at least one growth condition with the stored data and provides the first output result.

2. A method according to claim 1 in which the stored data on optimum water oxygen levels are for growth conditions comprising at least two, of substrate type, plant type, plant age, plant growth phase, time of day, time of year, light level, substrate water content, ambient temperature and ambient humidity and at least two, of these growth conditions are determined and input as actual growth conditions.

3. A method according to claim 1 in which the first output result is a notification of by how much the water oxygen level should be increased or decreased to achieve an optimum level.

4. A method according to claim 1 in which the monitoring system also comprises second data storage means containing stored modification data for methods of increasing and decreasing the water oxygen level and the monitoring system comprises a second calculating means for comparing the first output result with the stored modification data to give a second output result which specifies what modifications must be made to the growth conditions to achieve an optimum water oxygen level.

5. A method according to claim 4 wherein the stored modification data includes data on changing the suction pressure of water in the growth substrate.

6. A method according to claim 4 in which the monitoring system additionally comprises a display means and in the process at least one of the first output result and the second output result are supplied to the display means and displayed.

7. A method according to claim 4 additionally comprising providing an automatic control system and supplying to the automatic control system the second output result, whereby the automatic control system modifies the growth conditions automatically.

8. A method according to claim 7 wherein the automatic control system modifies the suction pressure of the water in the growth substrate.

9. A monitoring system for use in a method of monitoring plant growth comprising
    (a) a first data storage means containing stored data on an optimum water oxygen levels for at least two sets of growth conditions and (b) a first calculating means for comparing actual growth conditions and actual water oxygen level with the stored data and producing a first output result and (c) input means for providing to the monitoring system actual growth conditions and actual water oxygen levels to the monitoring system (d) a second data storage means containing stored modification data on methods for increasing and decreasing water oxygen level and (e) a second calculating means for comparing the first output result with the stored modification data to give a second output result which specifies what modifications must be made to the growth conditions to achieve an optimum water oxygen level, and (f) a display means for receiving the first output result and the second output result and displaying these.

10. An oxygen sensor system comprising a sensor for measuring water oxygen level in the region around the roots of a plant growing in a growth substrate and a monitoring system according to claim 9.

11. An oxygen sensor system according to claim 10 wherein the sensor is arranged to transfer the water oxygen level measurement automatically to the input means.

12. A method according to claim 1 in which the stored data on optimum water oxygen levels are for growth conditions comprising at least two of plant type, plant age, time of day and substrate water content and at least two of these growth conditions are determined and input as actual growth conditions.

13. A method according to claim 12 in which the stored data includes at least two, of the following:
   (a) cucumber plants of age 50 to 100 days have critical oxygen pressure of from 4 to 7 mg/l critical oxygen pressure at zero water flow rate in the morning,
   (b) cucumber plants of age 50 to 100 days have of from 4 to 6 mg/l at zero water flow rate and 100% water content in the middle of the day,
   (c) cucumber plants of age 50 to 100 days have COP of 2 to 5 mg/l at zero water flow rate and 100% water content at night,
   (d) cucumber plants of age 140 to 180 days have COP of 3 to 5 mg/l at zero water flow rate and 100% water content in the morning,
   (e) cucumber plants of age 140 to 180 days have COP of 1 to 3 mg/l at zero water flow rate and 100% water content in the middle of the day
   (f) cucumber plants of age 140 to 180 days have COP of 1 to 3 mg/l at zero water flow rate and 100% water content at night,
   (g) tomato plants of age 160 to 200 days have COP of from 3 to 6 mg/l at zero water flow rate and 100% water content.

14. A method according to claim 12 or claim 13 in which the input actual growth conditions include plant type, plant age, time of day and water flow rate.

15. A method of growing plants comprising monitoring the plants according to the method of claim 1.

16. A method according to claim 1 in which the growth substrate is a mineral wool growth substrate.

* * * * *